United States Patent [19]

Eichelburg

[11] 4,000,319

[45] Dec. 28, 1976

[54] COATED COMESTIBLES

[76] Inventor: Robert J. Eichelburg, Woodland Road, Pound Ridge, N.Y. 10576

[22] Filed: Apr. 23, 1974

[21] Appl. No.: 463,314

Related U.S. Application Data

[63] Continuation-in-part of Ser. No. 448,208, March 5, 1974.

[52] U.S. Cl. .................. 426/2; 426/62; 426/289; 426/635; 426/656; 426/805; 426/533
[51] Int. Cl.$^2$ .......................... A23L 1/28
[58] Field of Search ............. 426/60, 62, 92, 94, 426/96, 141, 175, 289, 293, 295, 204, 221, 222, 534, 650, 2, 533, 635, 656, 805

[56] References Cited

UNITED STATES PATENTS

| | | | |
|---|---|---|---|
| 2,764,487 | 9/1956 | Wickersham | 426/60 |
| 2,946,688 | 7/1960 | Rosenthal et al. | 426/60 |
| 3,713,976 | 1/1973 | Bunting et al. | 426/60 |
| 3,830,798 | 8/1974 | Herndon et al. | 426/175 |
| 3,946,114 | 3/1976 | Tsao | 426/656 |

*Primary Examiner*—Hiram H. Bernstein

[57] ABSTRACT

The palatability of comestibles, such as animal food is improved by coating such food with yeast from the genera ascomycetous yeasts or asporogenous yeasts. In one embodiment comestibles such as an animal food is coated with either *Torulopsis utilis* or *Saccharomyces cerevisiae*.

10 Claims, No Drawings

COATED COMESTIBLES

BRIEF SUMMARY OF THE INVENTION

The present invention is a continuation in part of my co-pending United States patent application Ser. No. 448,208 filed Mar. 5, 1974.

The palatability of comestibles such as an animal food is improved by coating such food with yeast from the genera ascomycetous yeast or asporogenous yeast. The yeast-like genera belonging to the order Ustilaginales (in the Basidiomycetes) and the yeast-like genera belong to the family Sporobolomycetaceae are also within the broad scope of the invention. In one embodiment, the palatability of animal food kibs such as dog or cat food is improved by coating such food with yeasts comprising either Torulopsis, Candida, or Saccharomyces. An outstanding feature of the invention is that the yeasts suitable for improving the palatability of comestibles such as animal food are high in essential B vitamins and proteins. The coated comstibles of the invention may also be used in the dry state, the palatability not being dependent on the addition to or incorporation of water or liquid to improve flavor or release flavor ingredients. Water or other liquids however may be employed, if desired. The examples describe the results obtained by coating comestibles suitable for use as animal food with *Torulopsis utilis* and *Saccharomyces cerevisiae*.

DETAILED DESCRIPTION OF THE INVENTION

The present invention relates to comestibles such as animal food especially animal food of improved palatability. More specifically, the present invention relates to animal food such as dog food or cat food having improved palatability.

Problems have been encountered with the prior art canned, dry and moist animal food in that some canned pet food although having good palatability, was low in nutritional value because anywhere from 60–70% of the canned food comprised water and further the ingredients of such canned foods were qualitatively lacking in the nutritive food values essential for sustaining animal health.

On the other hand, commercially-available dry animal food generally has low to poor palatability but is exceptionally high in nutritive value. This dry animal food is supplied as kibs which are spheres, cylinders or cubes of anywhere from about one-eighth inch to about one-fourth inch maximum dimension. The lack of palatability or poor palatability affects animal nutrition in that the animal fed with such food would not consume enough of the food to maintain proper health. Consequently several attempts have been made in the prior art to improve the palatability of dry animal food kibs as set forth in U.S. Pat. No. 3,119,691 Ludington et al. in which the kib has applied to it a coating which forms a gravy containing mixture upon addition of water.

One of the difficulties with the prior art dry animal food kibs having a coating which forms a gravy containing mixture on the addition of water was that after the kib had been treated with water the kib would tend to soften after standing about 12 hours, the animal would no longer be interested in the food and, consequently, the food had to be thrown out. Additionally, if the kibs were wet and allowed to stand for a sufficient length of time, the likelihood of spoilage would increase thereby negating the long storage properties of the dry kibs. This would be a particular disadvantage if the animal had to be left food for one or more days. Furthermore, the user of the food had to go to the difficulty of mixing up the dry animal food kibs with water prior to use which involved an extra step in the preparation of the animal food which detracts from the ready-to-use characteristics of dry food.

The prior art also teaches improvement in the palatability of dry animal food kibs by the addition of liquid beef extract such as beef broth or fish scrap. It has been observed, however, that even with the addition of liquid beef extracts, such as beef broth or fish scrap, to standard commercially-prepared dry animal food kibs, the resultant dry animal food kib does not have sufficient palatability to induce an animal to eat sufficient amounts of the animal food to maintain proper nutrition.

One of the other problems encountered in the prior art was the difficulty in formulating substantially farinaceous animal food such as those based on grains that include rye, wheat, oats, barley and corn to be palatable to carnivores. Admixing farinaceous materials with meat, meat by-products, and meat meal as additives and extracts thereof as flavorants were generally the method employed in the prior art to improve the palatability of farinaceous materials however this was generally expensive and of limited success. Similar problems were encountered in the prior art with formulating vegetable protein animal food to be palatable for carnivores. Again vegetable proteins admixed with meat, meat by-products, meat meal and extracts thereof was a method for obviating the problems as employed in U.S. Pat. No. 3,202,514 Burgess et al. with the attendant aforementioned drawbacks of high cost and limited success in avoiding the problem.

It has been observed that moist animal food as described in U.S. Pat. No. 3,202,514 Burgess et al. although having improved palatability over commercially-available dry animal food, the palatability of this moist animal food is not at an optimum and decreases after a period of about 2 days after unpackaging.

An additional problem with the prior art flavorants for animal food is that they are extremely low in any nutritive value.

It is therefore an object of the present invention to overcome these and other difficulties of the prior art and especially to provide a process for improving the palatability of comestibles such as animal food as well as to provide an article of manufacture comprising comestibles such as animal food having improved palatability.

It is a further object of the present invention to provide a process for improving the palatability of comestibles such as animal food and to provide an article of manufacture comprising comestibles such as animal food having improved palatability which does not require the addition of water or any other liquid to obtain such improved palatability.

It is a further object of the present invention to provide as an article of manufacture comestibles such as animal food which are substantially farinaceous compositions or vegetable protein compositions or mixtures thereof that are palatable to carnivores. It is also an object of the invention to provide a method of making a substantially farinaceous comestible or vegetable protein comestible or mixtures thereof palatable to a carnivore without the use of meat, meat by-products meat meal or extracts thereof.

It is a further object of this invention to improve the palatability of moist animal food of from about 15 to about 30% by weight moisture; meat or meat by-products or meat meal or mixtures thereof; vegetable protein and optionally from about 15% to about 30% by weight of sugar.

It is also an object of the present invention to provide a process for improving the palatability of comestibles such as animal food and to provide an article of manufacture comprising comestibles such as animal food having improved palatability by means of a product that is high in B vitamins and amino acids.

These and other objects have been achieved by the present invention in which an article of manufacture is provided comprising comestibles such as animal food which has been coated with yeast. Yeasts from either the group ascomycetous or asporogenous have been found to be effective in this regard. The yeast-like genera belonging to the order Ustilaginales (in the Basidiomycetes) and the yeast-like genera belong to the family Sporobolomycetaceae are also within the broad scope of the invention. The yeasts employed in accord with the present invention are further identified in the publication The Yeasts, A Taxonomic Study, edited by J. Lodder, 1970.

The various genera of yeasts within the group ascomycetous which can be employed according to the present invention include Endomycopsis, Kluyveromyces, Saccharomyces, Sacchromycodes, Saccharomycopsis and Schizosaccharomyces.

The various genera of asporogenous yeasts that can be employed according to the present invention especially asporogenous yeast not belonging to the Sporobolomycetaceae include Candida, Oosporidium and Torulopsis.

The species of yeast in the group asporogenous that can employed to advantage according to the present invention comprise *Torulopsis utilis* (*Candida utilis*) and *Candida arborea*, *Oospora lactis* (Oidium lactis, Endomyces lactis, Geotrichum candidum).

Because of the commercial usage the term "Torula yeast" or torula yeast is employed to designate the species *Torula utilis*, *Torulopsis utilis* and *Candida utilis*, the latter three being treated as synonyms in *The Yeasts, supra*. The genera Candida and Torulopsis are maintained as separate genera in *The Yeasts, supra* for the reasons stated at pages 894–897 thereof because a reclassification into natural taxa is considered "inadvisable since it would make necessary the provisory renaming of a great number of species. This would inevitably lead to confusion and justified irritation among the increasing number of workers in various fields who use or encounter yeast of this group."

The various species within the group ascomycetous which are also employed to advantage according to the present invention comprise *Saccharomyces cerevisiae*, *Saccharomyces cerevisiae* variety *ellipsoidus*, *Saccharomyces carlsbergensis* and *Saccharomyces fraglisis* (*Kluyveromyces fragilis*).

The genera of yeasts preferred in accord with the present invention comprise Torulopsis, Candida and Saccharomyces.

Commercially-available dried yeast which are used according to the present invention includes either primary dried yeast or secondary yeasts which may be classified as follows:

1. Primary dried yeast — *Saccharomyces cerevisiae*
2. Primary dried torula yeast — *Torulopsis utilis* (*Candida utilis*)
3. Secondary yeast, brewer's dried yeast — *Saccharomyces cerevisiae*, *Saccharomyces carlsbergensis*

The composition of commercially-available dried primary yeast is given in the 11th Edition of *The National Formulary*, pages 395–396 and is as follows:

| | | |
|---|---|---|
| protein (N X 6.25) | minimum | 45% |
| thiamine hydrochloride (vitamin $B_1$) | minimum | 120 $\mu g/g$ |
| riboflavin (vitamin $B_2$) | minimum | 40 $\mu g/g$ |
| nicotinic acid | minimum | 300 $\mu g/g$ |
| fermenting power | inactive | |
| fillers | none | |
| total bacterial count | maximum | 7500 $\mu g/g$ |
| mold count | maximum | 50 $\mu g/g$ |
| moisture | maximum | 7% |
| ash | maximum | 8% |

Primary dried yeasts which are marketed for food usage have the following analysis which is considered typical:

| | | | |
|---|---|---|---|
| moisture | 5.0% | calcium | 0.3% |
| protein | 50.0% | phosphorus | 2.4% |
| fat (ether ext.) | 1.2% | potassium | 2.6% |
| total lipids | 5.5% | magnesium | 0.5% |
| carbohydrates | 31.5% | sodium | 0.4% |
| ash | 8.0% | | |

The amino acid content of primary dried yeast is approximately as follows as expressed as a percent of dried proteins:

| | | | |
|---|---|---|---|
| alanine | 9.0% | lysine | 8.2% |
| arginine | 5.0% | methionine | 2.5% |
| aspartic acid | 4.0% | phenylalanine | 4.5% |
| cystine | 1.6% | proline | 2.5% |
| glutamic acid | 13.5% | threonine | 5.5% |
| glycine | 0.6% | (and serine) | |
| histidine | 4.0% | tryptophan | 1.2% |
| hydroxyproline | 4.5% | tyrosine | 5.0% |
| isoleucine | 5.5% | valine | 5.5% |
| leucine | 8.0% | others | 9.4% |

All essential amino acids are present as can be seen from the above analysis. The vitamin contents of the various products are as follows (in $\mu g/g$):

| | |
|---|---|
| thiamine | up to 10,000.0 |
| riboflavin | up to 12,000.0 |
| niacin | up to 30,000.0 |
| pyridoxine | 15.0 |
| pantothenic acid | 110.0 |
| biotin | 2.5 |
| inositol | 4,000.0 |
| choline | 4,000.0 |
| p-aminobenzoic acid | 13.0 |
| folic acid | 11.0 |

Secondary yeasts are those yeasts which are obtained upon the completion of brewery operation or production of alcohol from molasses and rum production, and is then subject to a purification after which it is dried to about 90% solids content and marketed as dried distiller's or dried brewer's yeast.

Primary and secondary brewer's dried yeast have approximately the same analyses.

Secondary brewer's dried yeast analyzes typically as follows:

| | | | |
|---|---|---|---|
| protein | 50.0% | zinc | 38.7 ppm |
| fat | 1.5% | salmonella | negative |
| fiber | 1.5% | coliform | |
| ash | 7.0% | bacteria | negative |
| moisture | 6.0% | thiamine | 56.6 mg/lb |
| nitrogen-free | | riboflavin | 16.0 mg/lb |
| extract | 34.0% | niacin | 225.5 mg/lb |
| calcium | 0.12% | pantothenic | |
| phosphorus | 1.50% | acid | 55.2 mg/lb |
| potassium | 0.86% | pyridoxine | 22.6 mg/lb |
| iron | 0.02% | choline | 2200.0 mg/lb |
| copper | 35 ppm | betaine | 544.0 mg/lb |
| manganese | 5.3 ppm | biotin | 0.5 mg/lb |
| cobalt | 1.5 ppm | folic acid | 22.2 mg/lb |
| | | inositol | 2265.0 mg/lb |

Other yeast which are suitable for the purposes of the present invention comprise vitamin enriched yeasts which are manufactured by the addition of vitamins such as vitamins B1, B2 and B6 to the broth in which the yeast is grown and from which the yeast will subsequently absorb the vitamins. One of the outstanding features of the yeast used in accord with the present invention is they synthesize vitamin B1 in large quantities during production by coupling thiazole and pyrimidine when these compounds are added to the medium in which the yeast is grown. Yeast which are made by the addition of thiazole and pyrimidine and vitamin-enriched yeasts manufactured according to U.S. Pat. No. 2,262,735 Schultz, et al., U.S. Pat. No. 2,359,521 Harrison and U.S. Pat. No. 2,328,025 Mead, et al. are also included within the scope of the present invention. Hydrolyzates of the foregoing yeasts may also be used according to the present invention and are prepared either by hydrolyzing such yeasts in a dilute aqueous hydrochloric acid solution or by an aqueous bacterial hydrolysis both of which are known in the art. The hydrolyzate thus obtained is dried and concentrated and employed in the same manner as the yeasts described herein. Any mixture of yeasts and/or hydrolyzates may also be employed according to the invention.

The farinaceous comestibles of the present invention may be made from any of the more common grains, such as corn meal, red dog flour, wheat germ, rye flour, wheat flour, oats, barley and the like, and any combination thereof.

The farinaceous comestibles utilizing the foregoing common grains or farinaceous materials may be prepared by methods well known in the baking art. The grains are ground into a flour-like consistency to which is added a liquid a shortening and, optionally, a leavening agent, such as baker's yeast or baking powder, and the mixture then baked at a suitable temperature for a fixed period of time. In one embodiment of the present invention, the farinaceous comestible prepared with a leavening agent is shaped into a crouton-like configuration having dimensions of approximately ¼ inches square dried at 110° F. for 2 hours and subsequently coated with the yeast of the present invention.

The comestibles of the present invention may also be made from vegetable protein materials which comprises oil seeds and legumes as well as the oil expressed or extracted meals and cakes and protein isolates thereof recovered by acid or alkali digestion and precipitation. Vegetable protein materials in this respect comprise soy beans, soy bean meal, soy bean powder, cotton seed meal, peanuts, peanut meal and the like and mixtures thereof.

The vegetable protein material may be used by itself. By way of example soy powder is pelletized by compression in a press into a ¼ inch diameter by ⅛ inch thickness round pellet and these pellets in turn are coated with the aforementioned yeast.

Mixtures of the farinaceous materials and protein materials, especially vegetable protein materials may be effected for example by substituting approximately 10% by weight of the grain flour previously described with soy bean powder and the baked goods prepared with this substitution. This combination of farinaceous material with the vegetable protein material is also coated with the yeast previously described.

The moist animal food which is also coated with the yeast in accord with the present invention is described in U.S. Pat. No. 3,202,514 Burgess et al. such moist animal food generally comprising from about 15 to about 30% by weight of moisture; from about 15 to about 30% by weight of sugar, meat or meat by-products or meat meal or mixtures thereof as meat protein material; and vegetable protein material as described previously, all of these terms being further described in U.S. Pat. No. 3,202,514 Burgess et al. along with other components employed in such moist animal food and the method for its manufacture.

The comestibles of the invention are thus prepared from farinaceous materials, or proteinaceous materials or mixtures of farinaceous and proteinaceous materials. Where the comestible comprises mixtures of farinaceous and proteinaceous materials, anywhere from about 2% to about 98% by weight of farinaceous material, especially from about 5% to about 80% by weight of farinaceous material is employed, the balance comprising proteinaceous material.

The proteinaceous material, whether employed by itself or in combination with the farinaceous material may be vegetable protein or meat protein or mixtures of both vegetable protein and meat protein. Where mixtures comprising vegetable protein and meat protein, are employed, the vegetable protein comprises anywhere from about 2% to about 95% by weight of the mixture and especially from about 5% to about 85% by weight of the mixture the balance comprising meat protein.

Since other ingredients may be used in the manufacture of the comestibles or are present therein such as water the farinaceous and/or proteinaceous materials will constitute anywhere from about 95% to about 5% by weight, especially from about 95% to about 60% by weight of the comestible.

The comestible of the invention may be dry by which it is meant it may contain anywhere from about 5% to about 12% by weight of water based on the comestible or it may be moist by which it is meant it may contain anywhere from above about 12% to about 40% by weight of water based on the comestible.

The comestible article of manufacture may be in the shape of a kib which is a sphere, cylinder or cube or other three dimensional shape having a maximum dimension of from about one eighth inches to about three fourths inches. The article of manufacture may also be biscuit shaped, wafer shaped or any shape commonly used for animal food. Biscuits may be anywhere from about ½ inches to about 2 inches in diameter and have a thickness of about 5% to about 50% of the diameter. Wafers may be anywhere from about ½ inches to about 6 inches in length, about ½ inches to about 3 inches in width and have a thickness anywhere from about 5% to about 50% of the width. The wafers may also be bone shaped. The comestible may also be prepared as a continuous cylindrical, triangular, rectangular etc. extrudate of about ¼ inches diameter.

The yeast coating may be applied to all sides or only one side or any combination of sides of the comestible. The coating may also be applied as stripes on the side of the comestible or what will be defined herein as flavor channels which are grooves having a depth of from about 1% to about 20% of the maximum thickness of the comestible and are filled with the yeast coating. A continuous coating of yeast or flavor channels may be applied by continuous coextrusion of the comestible and yeast coating through an extrusion die.

The coated comestible such as animal food have anywhere from about 0.5 to about 20% by weight of yeast as a coating on the surface or in the flavor channels of such comestible where the aforesaid weight percent of yeast is based on dry yeast i.e. yeast having from about 3 to about 10% by weight of water.

Although the yeast in one embodiment is applied to the comestibles such as the animal food as a dry coating it may also be mixed with a binder, such as fat, e.g. tallow fat, or other edible binders known in the food art such as, starch binders, pre-cooked potato flour, pre-gelatinized starch, pre-gelatinized corn flour or the equivalent thereof, such as polymerized alkylene oxides, e.g. ethylene oxide, carrgeenins, alginates, locust bean gum, gum karaya, gum tragacanth and guar gum. Carboxymethyl cellulose may also be employed in this regard. When the yeast is employed in combination with a binder anywhere from about 5 to about 95% by weight, especially from about 20% to about 80% by weight of yeast to binder may be employed. The yeast or yeast and binder may be applied to the comestibles such as the animal food by first moistening the surface of the comestible to convert the farinaceous material and/or proteinaceous material at the surface into a semi-moist tacky adhesive substrate onto which the dry yeast or yeast and binder may be applied after which the comestibles thus coated may be dried so that the overall moisture content of the comestibles will be within any parameters desired. The yeast or yeast and binder may also be applied to the surface of the comestible as a coating, the comestible thus coating is moistened and dried.

Since the yeast coating with or without a binder of the present invention may provide a suitable substrate for the growth or mold or bacteria especially when used as a coating for moist animal food, anti-mycotic and/or anti-bacterial agents may be optionally employed in combination with the yeast or yeast and binders to inhibit such development of mold and bacteria. Standard anti-mycotic and/or anti-bacterial agents known in the art may be employed each in amounts from 0.1% to about 2.5% by weight of the yeast although amounts as low as 50 p.p.m. may be used.

By way of example, anti-mycotic agents employed in this aspect of the invention include propylene glycol, diethyl pyrocarbonate, proprionic acid, sodium and calcium proprionate, benzoic acid, sodium benzoates, sorbic acid, potassium and calcium sorbate, menadione sodium bisulfite (vitamin K). Vitamin K is especially preferred in this respect. Art-known Bacteriostatic compounds may also be employed such as acidulants, sugars, sodium chloride, and where high moisture binders or comestibles are employed, sorbitol, propylene glycol and other art-known equivalents that provide protection due to the osmotic pressure effect of such additives. These anti-mycotic agents and/or anti-bacterial agents or any combination thereof may be incorporated directly into the yeast and/or binders which are described herein. The anti-mycotic and/or anti-bacterial agents may also be incorporated into the comestible as well in an amount from about 0.1 to about 2.5% by weight of the comestible and in some instances in amounts as low as 50 p.p.m.

The following examples are illustrative.

EXAMPLE 1

A loaf of white bread based on white flour, water, milk, shortening, sugar and salt was prepared according to a standard recipe utilizing commercially-available baker's yeast as the leavening agent. The bread was cut into approximately ¼ inches cube croutons and dried at 110° F. for 2 hours and subsequently coated in one instance with 12% by weight of primary dried yeast *Saccharomyces cerevisiae*, and in another instance, 12% by weight of primary dried torula yeast *Torulopsis utilis*, the weight percent of the coating in both instances being based on the weight of the dried croutons.

The coating in each instance was applied by placing the yeast in the bottom of a container and adding a weighed amount of the croutons thereto and rotating the container until all the croutons were coated. It was observed that the dried yeast adhered to or was in place on the surface of the croutons due to the porosity of the croutons or various interstices on the surface of the croutons into which the particles of dried yeast were adhered, trapped or held as a coating.

Upon presenting a common house cat a two ounce portion of the croutons coated with the primary dried torula yeast as described in this example the coated croutons were immediately consumed by the animal. Prior to presenting the coated croutons, the animal was regularly fed so that it was not unduly hungry when given the coated croutons i.e. an ordinary food regimen was maintained to assure that the animal was not excessively hungry when presented with the coated croutons. The same results were obtained with the croutons coated with the primary brewer's dried yeast as described in this example i.e. *Saccharomyces cerevisiae*.

EXAMPLE 2

The method of preparing the white bread of Example 1 was repeated employing a standard recipe, however, the white wheat flour was partially replaced with 15% by volume of commercially-available soy bean powder which had been ground to about the same consistency as the white wheat flour.

The bread obtained in this instance again was cut into aproximately ¼ inches cube croutons dried at 110° F. for 2 hours and coated with the same yeasts and in the same manner described in Example 1. Two ounce portions of the yeast-coated croutons thus prepared were presented to a common house cat and each portion was immediately consumed by the animal. Again, the animal was given a regular regimen of food prior to feeding it the coated croutons to assure that it was not excessively hungry.

EXAMPLE 3

A 4 ounce portion of commercially-available moist dog food prepared in accord with U.S. Pat. No. 3,202,514 Burgess et al. was presented to a common house cat for 4 days and only about 2 ounces of the portion was eaten by the animal. On the fourth day, the portion that was not consumed was then moistened lightly at the surface and 12% by weight of primary dried yeast *Saccharomyces cerevisiae* based on the moistened food was applied thereto as a coating and presented to the animal whereupon it was immediately consumed.

It can be seen by employing the article of manufacture of the present invention that a comestible such as an animal food can be prepared which has improved palatability and additionally the compound for enhancing the palatability of the comestible such as an animal food is high in essential B vitamins as well as proteins. It is unexpected that a compound which is high in nutritive value also imparts improved palatability to animal food. It is also unexpected that improved palatability for an animal food employed for the nutrition of dogs or cats is obtained with a non-meat source such as the yeasts employed according to the present invention. It is even more unexpected that a non-meat compound such as the yeasts of the present invention can be applied to a non-meat comestible as a surface coating and the coated comestible thus obtained would be eaten by a carnivore as illustrated in Examples 1 and 2. According to the prior art methods, meat, meat extracts and the like were employed such as beef, beef broth or other beef extracts and fish scrap or fish extracts in order to improve the palatability of carnivore animal food. It is also unexpected that a non-meat product of the present invention would improve the palatability of a meat based animal food for a carnivore as illustrated in Example 3.

Various ranges have been employed throughout the specification to describe the various parameters of the invention however it is intended that where a range of properties is given that this range is to include any range falling within the range as well as any individual value within the range. By way of example and not limitation, the yeast coating is described as from about 0.5% to about 20% by weight of the animal food and a narrower range such as about 1% to about 12%, about 5% to about 10% by weight as well as any single value within the range such as 7.5%, 15% and the like are intended to be included within this range. As a further example, the moisture content of the yeast employed is given as anywhere from about 5% to 10% by weight and again the range is intended to include a narrower range within the range such as from about 6% to about 8% and any value falling within the range such as 7%, 9% and the like. This definition of the ranges of values is also to include the ratio of yeast to binder if the binder is optionally employed, anti-mycotic and anti-bacterial agents as well as every other value given in the specification as a parameter or a set of parameters for practicing the invention set forth herein.

Although the invention has been described by reference to some preferred embodiments it is not intended that the novel article of manufacture and the method for making the same be limited thereby but that certain modifications are intended to be included within the broad scope of the preceding disclosure and the following claims.

What is claimed is:

1. A process for improving the palatability of cat food comprising coating said food with about 0.5% to about 20% by weight of a yeast selected from a member of the group consisting of ascomycetous yeasts and asporogenous yeasts and feeding said coated food to a cat.

2. The method of claim 1 where said yeast is selected from a member of the group consisting of the genera Endomycopsis, Kluyveromyces, Saccharomyces, Saccharomycodes, Saccharomycopsis, Schizosaccharomyces, Candida, Oosporidium and Torulopsis.

3. The method of claim 1 where said yeast comprises Torulopsis.

4. The method of claim 1 where said yeast comprises Candida.

5. The method of claim 1 where said yeast comprises Saccharomyces.

6. The method of claim 3 where said yeast comprises *Torulopsis utilis*.

7. The method of claim 5 where said yeast comprises *Saccharomyces cerevisiae*.

8. The method of claim 2 where said cat food comprises a farinaceous material.

9. The method of claim 2 where said cat food comprises a farinaceous material.

10. The method of claim 2 where said cat food comprises a mixture of proteinaceous and farinaceous materials.

* * * * *